US 11,836,189 B2

United States Patent
Bianchi et al.

(10) Patent No.: US 11,836,189 B2
(45) Date of Patent: Dec. 5, 2023

(54) INFER TEXT CLASSIFIERS FOR LARGE TEXT COLLECTIONS

(71) Applicant: International Business Machines Corporation, Armonk, NY (US)

(72) Inventors: Thiago Bianchi, São Carlos (BR); John Donald Vasquez, Munich (DE); John Maxwell Cohn, Richmond, VT (US)

(73) Assignee: International Business Machines Corporation, Armonk, NY (US)

( * ) Notice: Subject to any disclaimer, the term of this patent is extended or adjusted under 35 U.S.C. 154(b) by 536 days.

(21) Appl. No.: 16/829,141

(22) Filed: Mar. 25, 2020

(65) Prior Publication Data
US 2021/0303627 A1  Sep. 30, 2021

(51) Int. Cl.
| | | |
|---|---|---|
| *G06F 16/906* | (2019.01) | |
| *G06F 16/93* | (2019.01) | |
| *G06N 20/00* | (2019.01) | |
| *G06N 5/04* | (2023.01) | |

(52) U.S. Cl.
CPC ............ *G06F 16/906* (2019.01); *G06F 16/93* (2019.01); *G06N 5/04* (2013.01); *G06N 20/00* (2019.01)

(58) Field of Classification Search
CPC ....... G06F 16/906; G06F 16/93; G06N 20/00; G06N 5/04
See application file for complete search history.

(56) References Cited

U.S. PATENT DOCUMENTS

| | | |
|---|---|---|
| 5,182,708 A | 1/1993 | Ejiri |
| 5,371,807 A | 12/1994 | Register et al. |
| 5,675,710 A | 10/1997 | Lewis |
| 6,137,911 A | 10/2000 | Zhilyaev |
| 6,507,829 B1 | 1/2003 | Richards et al. |
| 6,556,987 B1 | 4/2003 | Brown et al. |
| 7,024,408 B2 | 4/2006 | Dehlinger et al. |
| 9,171,070 B2 | 10/2015 | Alspector et al. |
| 10,324,971 B2 | 6/2019 | Andrade Silva et al. |
| 10,445,415 B1 | 10/2019 | Spellward et al. |
| 2002/0099730 A1 | 7/2002 | Brown et al. |
| 2003/0037073 A1* | 2/2003 | Tokuda ................ G06F 16/355 707/E17.09 |
| 2006/0142993 A1 | 6/2006 | Menendez-Pidal et al. |
| 2012/0131015 A1* | 5/2012 | Al Badrashiny ..... G06F 40/253 707/E17.084 |
| 2014/0136542 A1* | 5/2014 | Cooper ................ G06F 16/285 707/740 |
| 2018/0114142 A1 | 4/2018 | Mueller |

* cited by examiner

*Primary Examiner* — Irete F Ehichioya
*Assistant Examiner* — Xiaoqin Hu
(74) *Attorney, Agent, or Firm* — Van Leeuwen & Van Leeuwen; Jordan T. Schiller (57) ABSTRACT

An approach is provided in which the approach calculates at least one weighting factor based on a word frequency analysis of an unlabeled document against a set of word frequencies corresponding to a set of labeled documents. The approach computes an a posteriori classification probability of the unlabeled document based on the at least one weighting factor, and creates an inferred classifier based on the a posteriori classification probability. The approach classifies the unlabeled classifier using the inferred classifier.

12 Claims, 8 Drawing Sheets

Weighting Factor 1 Equation 710

$$wf_{jk} = \frac{f_j}{\sum_{w_j \in D_k} f_j} \cdot \sum_{w_j \in D} f_j$$

Weighting Factor 2 Equation 720

$$wf_{jk} = \log(wf_{jk} + 1)$$

Weighting Factor 3 Equation 730

$$wf_{jk} = wf_{jk} \cdot \log\left(\frac{\sum_{d_i \in C_k} 1}{\sum_{d_i \in C_k} \delta_{ij}}\right)$$

Weighting Factor 4 Equation 740

$$wf_{jk} = wf_{jk} + \log\left(\frac{\sum_{d_i \in C} 1}{\sum_{d_i \in C} \delta_{ij}}\right)$$

FIG. 7

Matrix 800

$$M_{m \times m} = \begin{bmatrix} f_{11} & f_{12} & \cdots & f_{1j} & f_{1m} \\ \vdots & \vdots & \ddots & \vdots & \vdots \\ f_{i1} & f_{i2} & \cdots & f_{ij} & f_{im} \\ \vdots & \vdots & & \vdots & \vdots \\ f_{m1} & f_{m2} & \cdots & f_{mj} & f_{mm} \end{bmatrix}$$

Equation 810

$$P(\widehat{c_k | d_u}) = \prod_{w_j \in D_k} \frac{f_j \cdot wf_{jk}}{\sum_{w_j \in D_k} f_j \cdot wf_{jk}}$$

Equation 820

$$\log(P(\widehat{c_k | d_u})) = \sum_{w_j \in D_k} -1 \cdot \log\left(\frac{f_j \cdot wf_{jk}}{\sum_{w_j \in D_k} f_j \cdot wf_{jk}}\right)$$

Equation 830

$$f_{method}(d_u) = \underset{c_k \in C}{\arg\max} \frac{\exp(\log(P(\widehat{c_k | d_u})))}{\sum_{c_k \in C} \exp(\log(P(\widehat{c_k | d_u})))}$$

Equation 840

$$f_{method}(d_u) = \underset{c_k \in C}{\arg\max} \frac{\exp \sum_{w_j \in D_k} -1 \cdot \log\left(\frac{f_j \cdot wf_{jk}}{\sum_{w_j \in D_k} f_j \cdot wf_{jk}}\right)}{\sum_{c_k \in C} \exp \sum_{w_j \in D_k} -1 \cdot \log\left(\frac{f_j \cdot wf_{jk}}{\sum_{w_j \in D_k} f_j \cdot wf_{jk}}\right)}$$

Equation 850

$$wf_{jk} = \log\left(\frac{f_j}{\sum_{w_j \in D} f_j} \cdot \sum_{w_j \in D} f_j + 1\right) \cdot \log\left(\frac{\sum_{d_i \in c_k} 1}{\sum_{d_i \in c_k} \delta_{ij}}\right) + \log\left(\frac{\sum_{d_i \in C} 1}{\sum_{d_i \in C} \delta_{ij}}\right)$$

FIG. 8

INFER TEXT CLASSIFIERS FOR LARGE TEXT COLLECTIONS

BACKGROUND

Software-intensive systems have become increasingly large, complex, and at times are an outcome from combining interoperable constituent systems to provide more complex capability than each of the constituent systems separately. This class of systems is referred as System-of-Systems and is present in several domains such as medical domains, airport domains, robotics domains, and automotive domains. System-of-Systems are a composition of different types of systems, such as embedded systems and large ERP's (Enterprise Resource Planning).

System-of-Systems are proliferating due to the advancement of computer technology and from the increasing complexity and size of software systems. System-of-Systems are a set of operationally independent software systems that collaborate together to compose a larger and more complex system to meet the emerging needs of current software systems, which perform increasingly complex tasks often in a decentralized manner. In short, System-of-Systems capabilities emerge from the collaboration between its constituent systems rather than from a singular constituent system.

BRIEF SUMMARY

According to one embodiment of the present disclosure, an approach is provided in which the approach calculates at least one weighting factor based on a word frequency analysis of an unlabeled document against a set of word frequencies corresponding to a set of labeled documents. The approach computes an a posteriori classification probability of the unlabeled document based on the at least one weighting factor, and creates an inferred classifier based on the a posteriori classification probability. The approach classifies the unlabeled classifier using the inferred classifier.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 8 an exemplary list of equations utilized to compute class a posteriori probabilities of an unlabeled document.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

Figure 1:
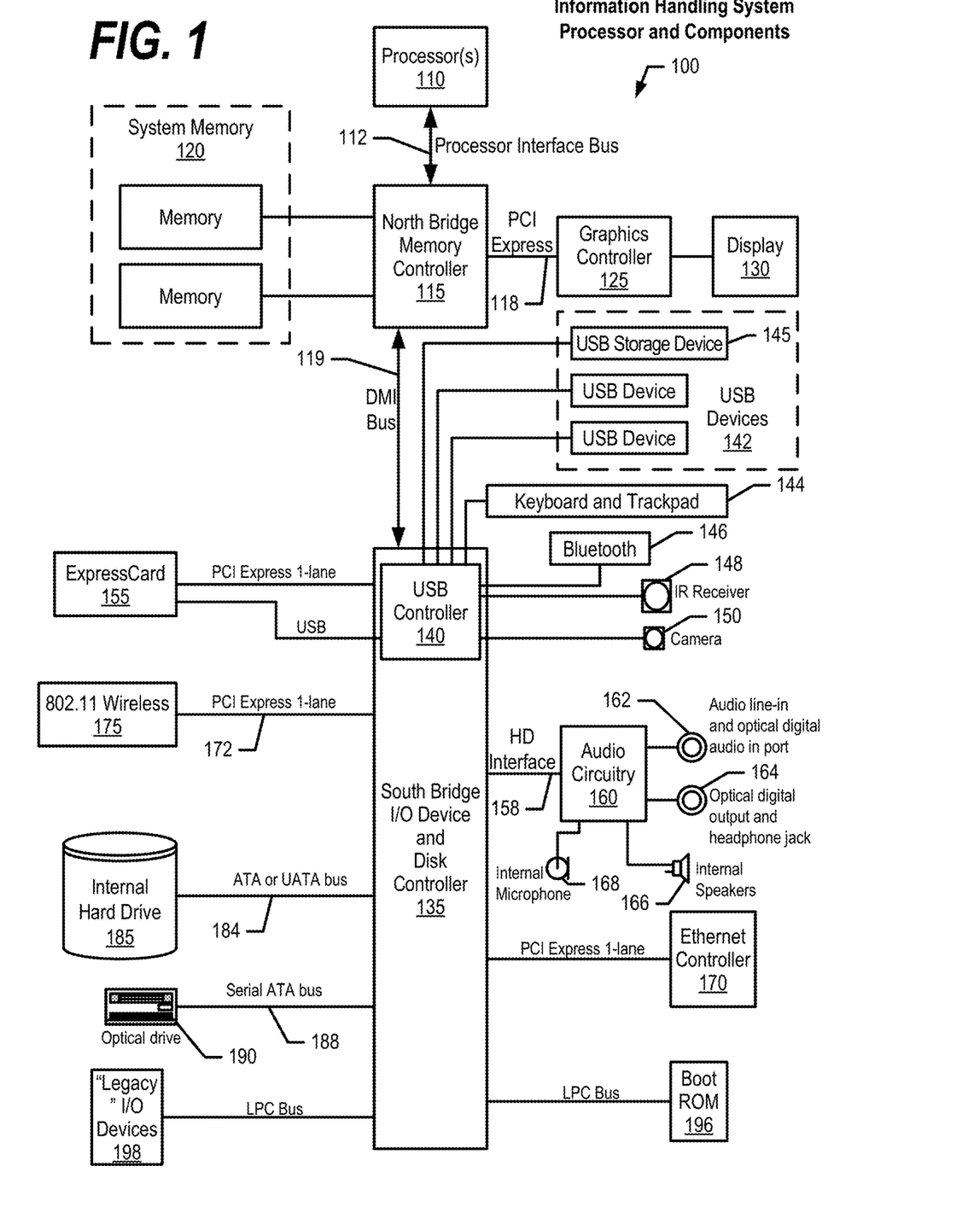
FIG. 1 is a block diagram of a data processing system in which the methods described herein can be implemented.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wirelessly communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
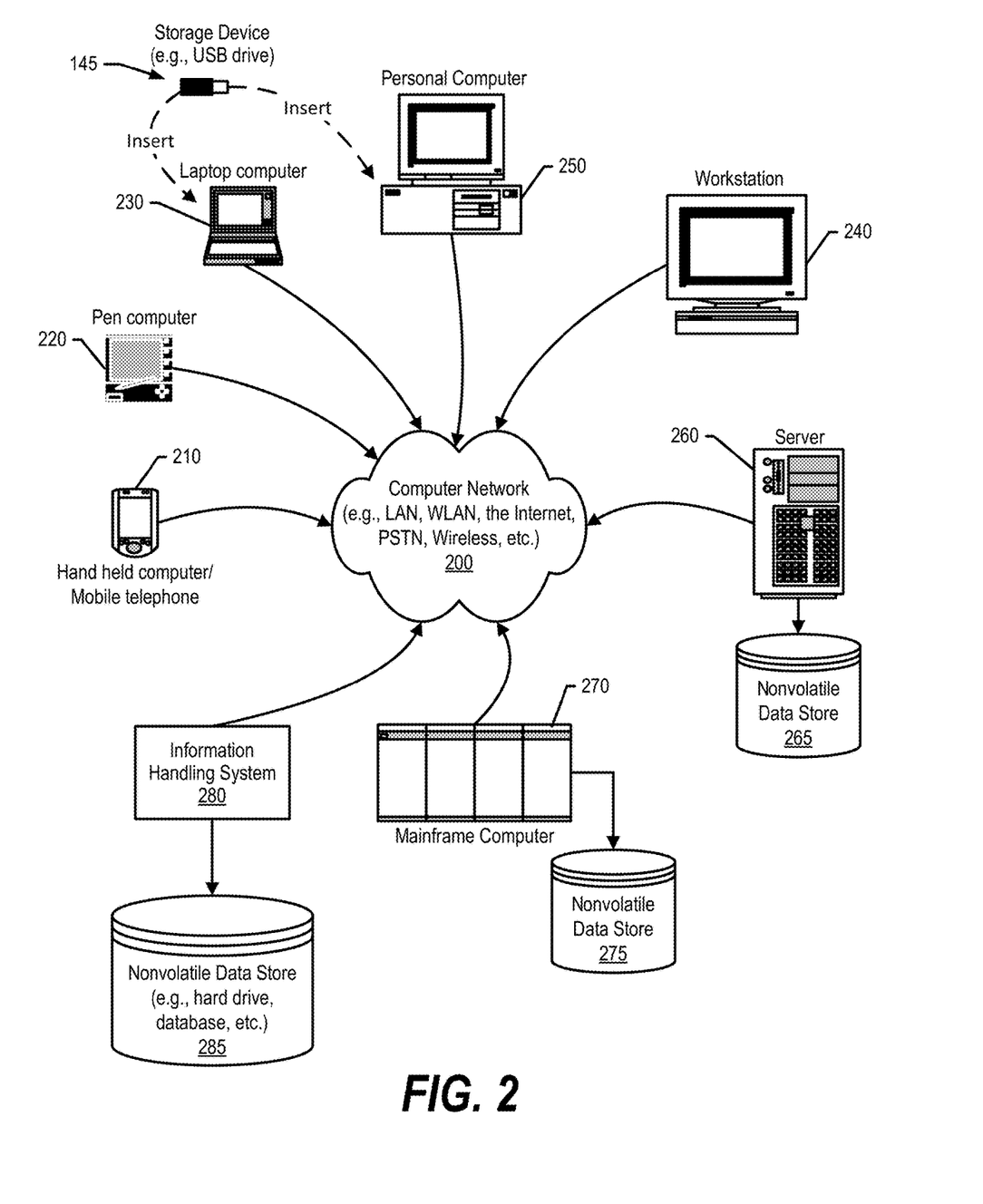
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, System-of-Systems are complex software systems that include a collection of collaborating constituent systems. A challenge with managing System-of-Systems emerges from unpredicted collaborations among the constituent systems. For example, a System-of-Systems must deal with the loss, inclusion, or replacement of constituents at runtime and adjust its behavior to available resources. In this example, the System-of-Systems must evolve to handle the dynamic adaptation and important characteristics for the success of the System-of-Systems, such as interoperability, maintainability, and dynamic evolution, which requires the appropriate software and leads to an even larger system.

Prior computer systems have been used as an important tool for managing information in environments that facilitate the production and exchange of information, such as web systems, web services, and cloud computing. These systems have handled very large amounts of data in different formats referred to as "Big Data." The systems use extracted knowledge to assist end users in performing actions or even performing the actions automatically without human intervention, such as classifying text and/or documents. Some computer systems use Naive Bayes classifiers to classify text/documents. Naive Bayes classifiers are a family of simple "probabilistic classifiers" based on applying a Bayes theorem with strong (naïve) independence assumptions between a set of features features.

A Naive Bayes model requires a unique terms definition dictionary or words extracted from a collection of documents to function adequately. Each document in the collection is represented by a vector containing the number of occurrences of each word in the dictionary. The vector preserves an order so that each of its elements is associated with a particular word in the dictionary. After counting occurrences in all documents, a matrix is generated in which rows correspond to documents and columns identify the terms. Next, a terms probability is computed to obtain a term-frequency matrix that is then used to classify unseen (unlabeled) documents using the Naive Bayes formulation. Each collection has a particular dictionary that contains hundreds of thousands of words.

However, the Naive Bayes formulation, also known as Multinomial Naive Bayes, presents systemic errors that cause an inappropriate favoring of one class over the other. Some systemic errors include weight magnitude errors, burstiness errors, and unbalanced or skewed data errors. Weight magnitude errors occur when the magnitude of occurrences of one word count is larger in one class over the other classes, which leads to the larger magnitude class being preferred by the classifier. Burstiness errors occur because the Bayes classifier uses a multinomial assumption to model the occurrences of a word in a text and ignores the importance of the attributes. Bayes classifiers abandon the possibility of obtaining more information from documents collection to reduce the entropy of each class, which is one of the reasons why attribute weighting methods provide more accurate classification results than Bayes classifiers. Unbalanced or skewed data errors occur when more training examples are used for one class than another, which can cause the probabilities to be biased and result in the classifier unwittingly preferring one class over the other.

Prior systems that employ naive Bayes classifiers perform a training phase that computes and stores a probability P(Bi|Ak) of words 'wj' being associated with a class 'ck' instead of storing a counting of the words themselves. When a document is added or removed in a collection, the system recalculates the probabilities of all the words based on the current collection of documents. Therefore, considering the dynamic characteristic of System-of-Systems discussed above, automatically classifying documents is difficult due to the dynamically changing System-of-Systems intrinsic characteristics. Changes in the System-of-Systems may implicate changes in the collection of documents so that a new classifier must be inferred at a high computational cost, especially for Big Data scenarios where the collection is formed by hundreds of thousands (even millions) of documents.

FIGS. 3 through 8 depict an approach that can be executed on an information handling system considers large collections of documents to infer a naive Bayes (Bayesian) classifier and minimize the retraining effort, thereby preserving the performance for classification tasks and providing high levels of accuracy. The approach automatically infers text classifiers for System-of-Systems (SoS) in Big Data scenarios with large document collections that often changes.

Prior solutions required a predefined list of words, a computational costly training step to infer a text classifier, and a method that does not consider skewed or unbalanced datasets. The approach discussed herein (i) does not require parameters, (ii) minimizes the training (and retraining) effort to infer a text classifier with high levels of accuracy, and (iii) takes into account skewed and unbalanced datasets.

Users of System-of-Systems often need to manually register unstructured, critical texts such as work orders, service requests, etc., and also need to map the text to structured information. This, however, is a repetitive, time/effort consuming, and error-prone task. The approach discussed herein automatizes text-based tasks in the System-of-Systems considering Big Data scenarios by inferring a classifier with minimum training/retraining effort. The approach also employs stemmer and stop words removal algorithms to maximize the accuracy of the inferred classifier.

Figure 3:
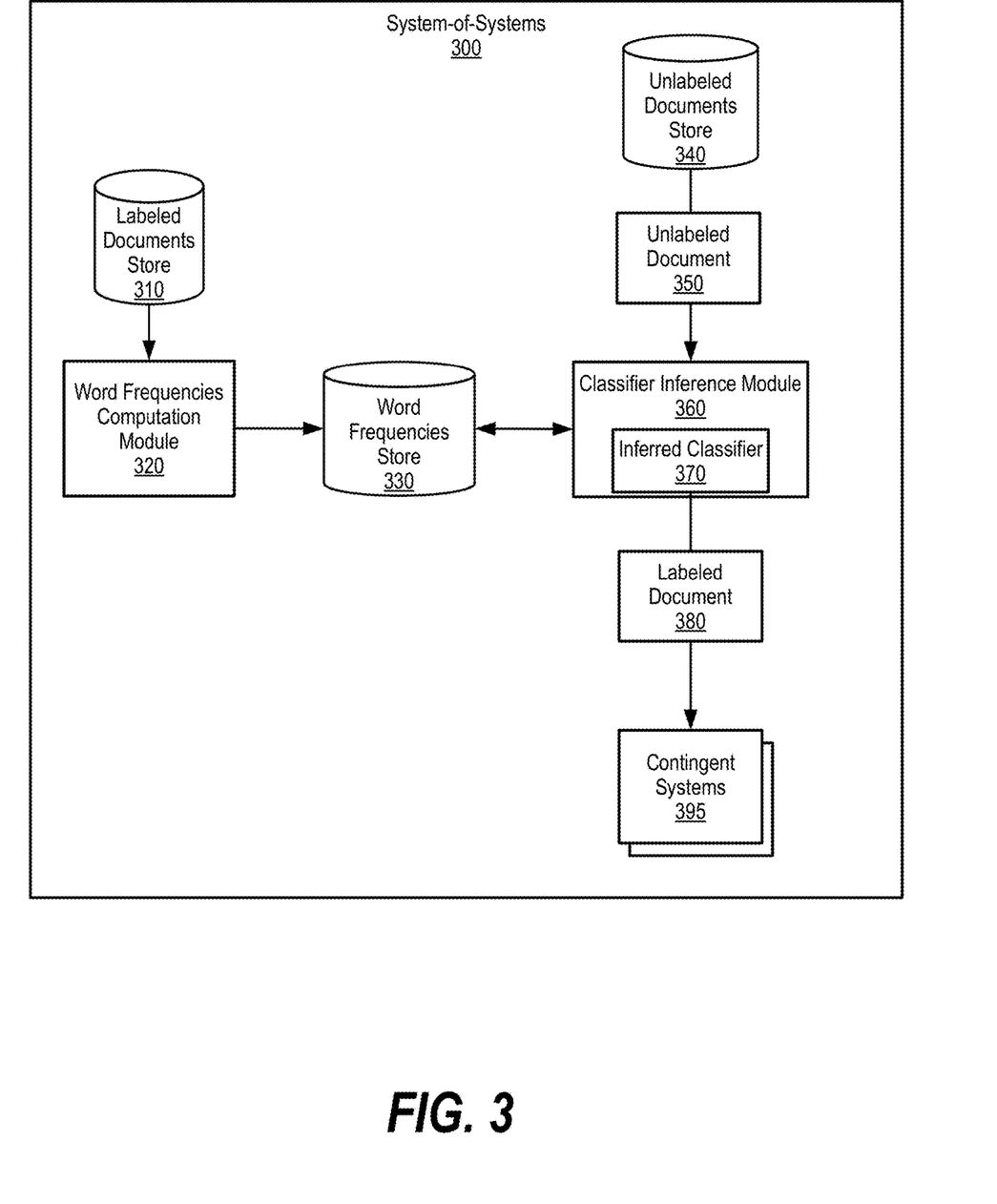
FIG. 3 is an exemplary high-level diagram depicting a System-of-Systems computing word frequencies from labeled documents and using the word frequencies to infer a classifier for an unlabeled document.

FIG. 3 is an exemplary high-level diagram depicting a System-of-Systems that computes word frequencies from classified (labeled) documents and uses the word frequencies to infer a classifier for an unlabeled document. System-of-Systems 300 analyzes large supervised document collections and employs a series of transformations to infer a text classifier from previously-classified textual documents. In particular, System-of-Systems 300 considers dynamic characteristics of Big Data scenarios (e.g., large collections of often changing documents) and computes a posteriori classification probabilities to classify unseen (unlabeled) documents.

Word frequency computation module 320 retrieves a large collection of previously-classified documents from labeled documents store 310 and removes stop words and stems the remaining words. Word frequency computation module 320 organizes the words into a dictionary of unique terms and applies a bag-of-words process in which each document results in a vector containing the number of occurrences for each word. Word frequency computation module 320 then updates the word frequencies in word frequencies store 330 (see FIG. 5 and corresponding text for further details).

Classifier inference module 360 retrieves unlabeled document 350 from unlabeled documents store 340, removes stop words, stems the remaining words, and organizes the words into a dictionary of unique terms. Classifier inference module 360 counts the frequencies of the unique words in unlabeled document 350 and uses the unique word frequency counts in conjunction with the word frequencies stored in word frequencies store 330 to compute a group of weighting factors.

Classifier inference module 360 then applies the weighting factors to compute a probability of unlabeled document 350 being classified as each one of the classes listed in a collection of previously-classified documents. Classifier inference module 360 then infers inferred classifier 370 without providing any parameters and uses inferred classifier 370 to label unlabeled document 350 and generate labeled document 380. In turn, labeled document 380 passes to contingent systems 395 for further processing (see FIGS. 4, 6, 7, and corresponding text for further details).

Figure 4:
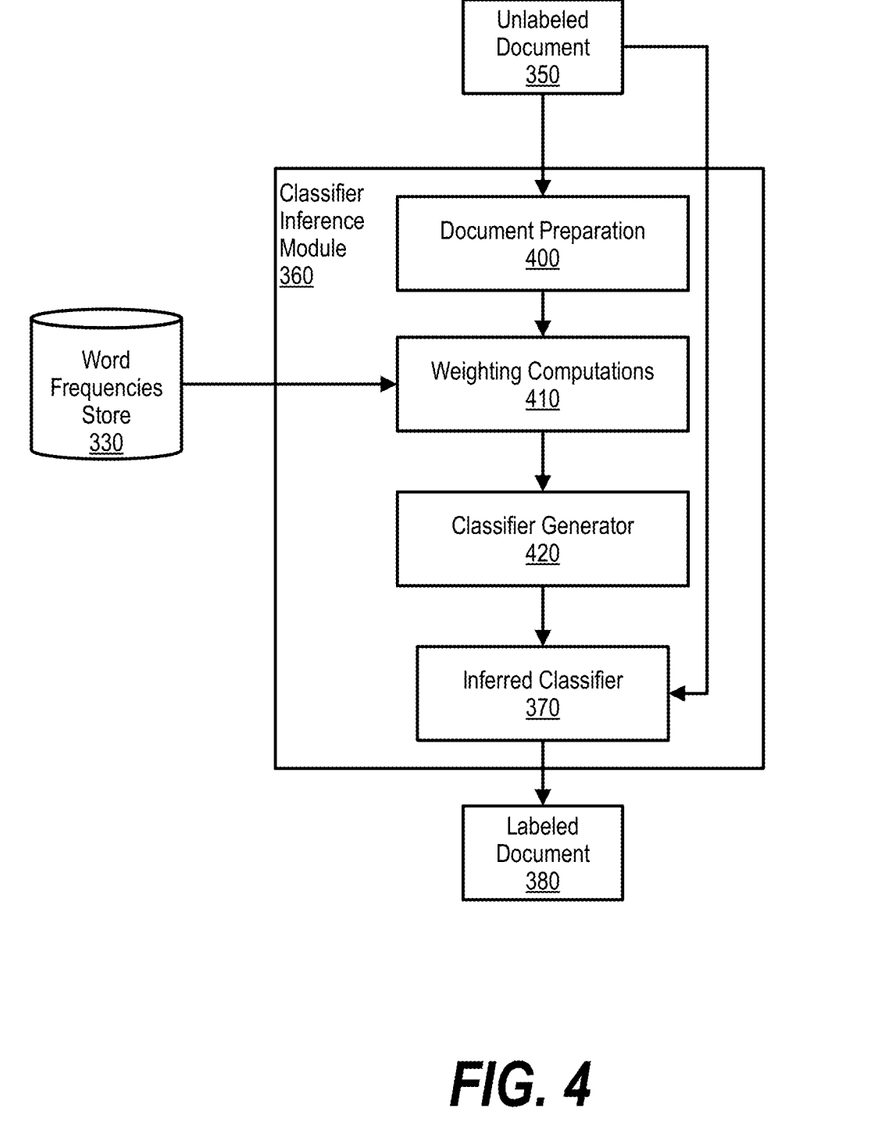
FIG. 4 is an exemplary detail diagram of a classifier inference module inferring a text classifier for an unlabeled document.

FIG. 4 is an exemplary detail diagram showing a classifier inference module inferring a text classifier for an unlabeled document. Classifier inference module 360 retrieves unlabeled document 350 and performs document preparation 400, which includes removing stop words, stemming the remaining words, and organizing the words into a dictionary of unique terms.

Figure 6:
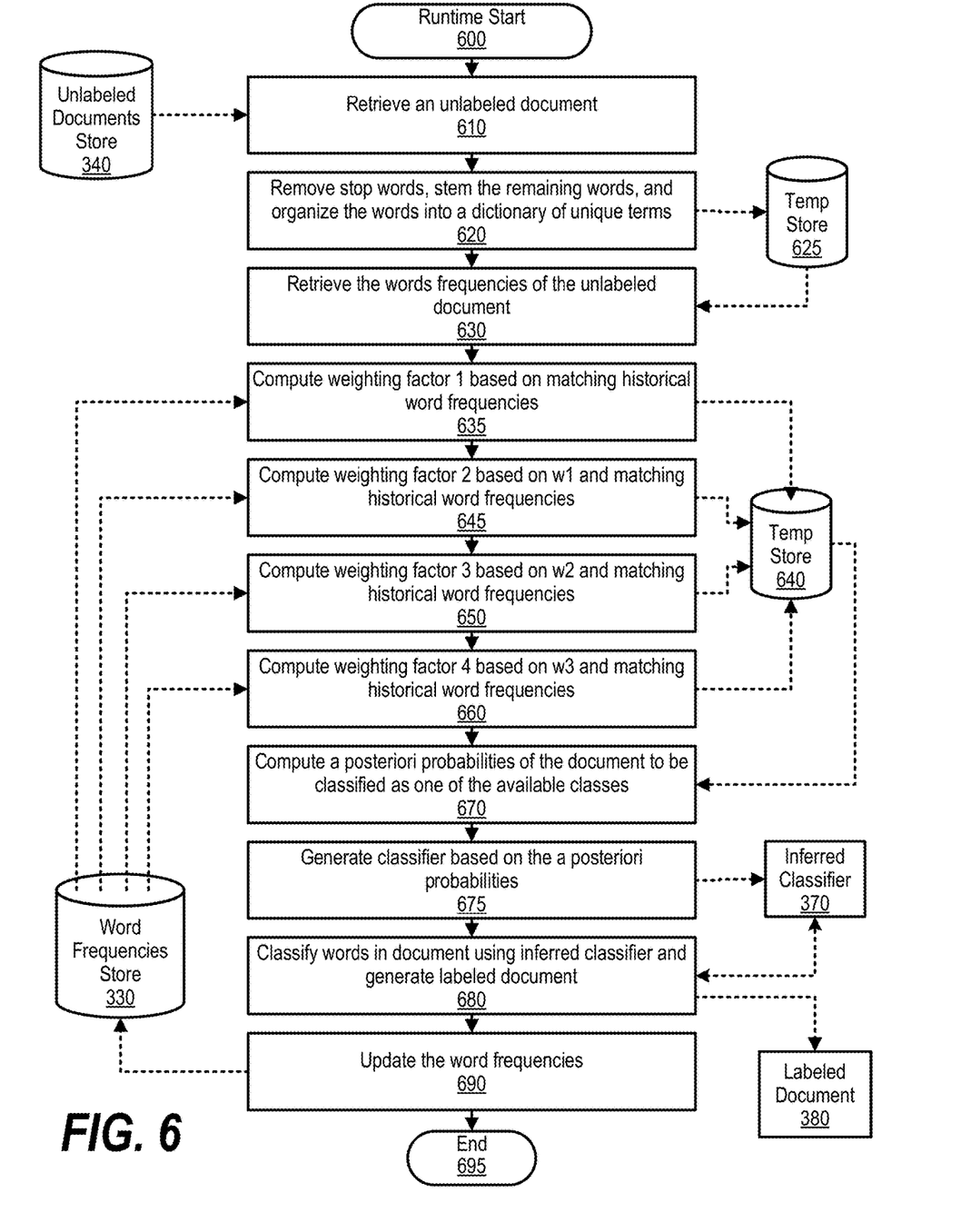
FIG. 6 is an exemplary flowchart showing steps taken to infer a classifier for an unlabeled document and use the inferred classifier to classify (label) the unlabeled document.
Figure 7:
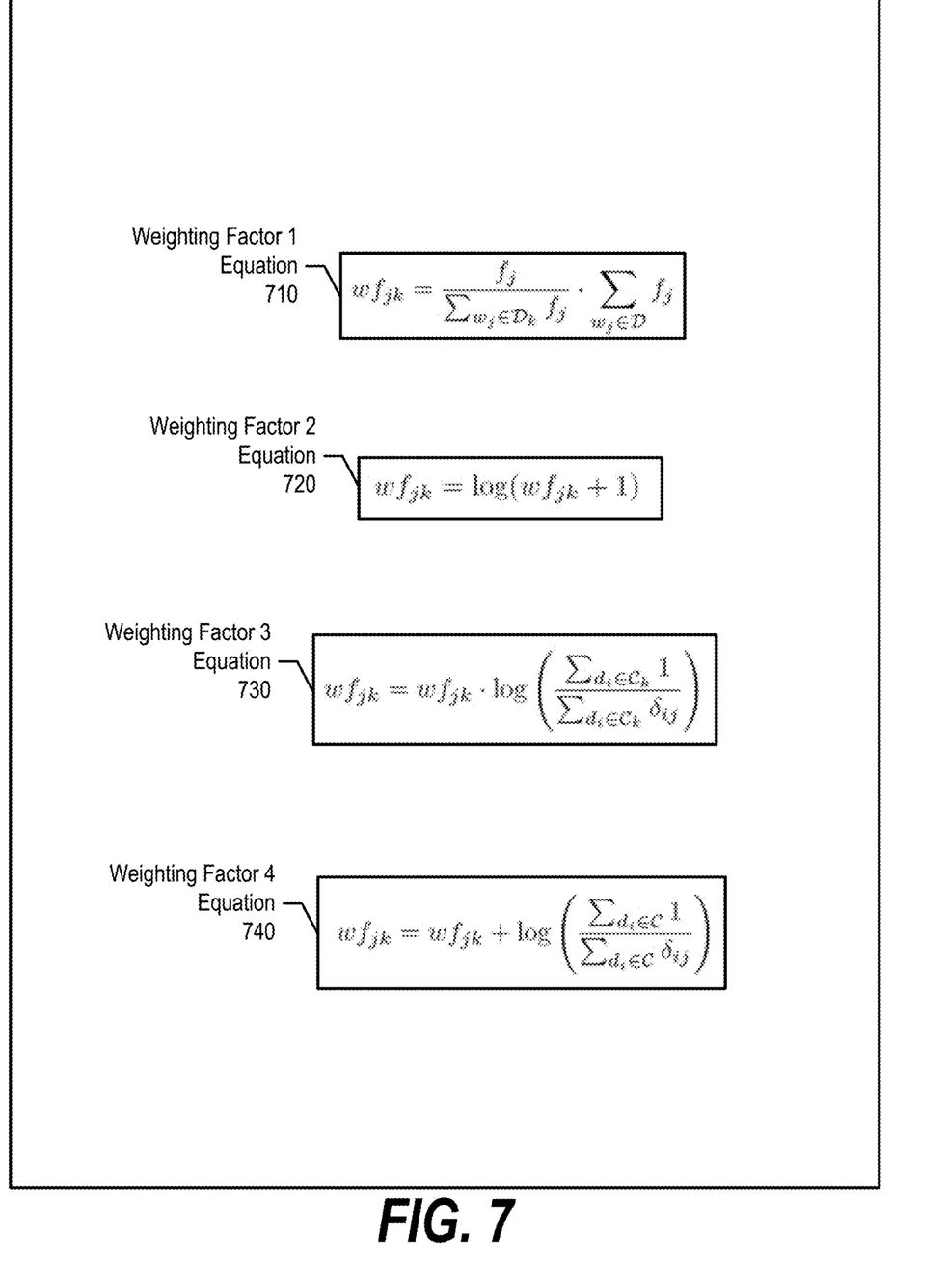
FIG. 7 an exemplary list of weighting factor equations to compute various weighting factors.

Next, weighting computations 410 retrieves word frequencies from word frequencies store 330 and computes weighting factors w1, w2, w3, and w4 based on the dictionary of unique words from document preparation 400 (see FIGS. 6, 7, and corresponding text for further details). Weighting factor w1 normalizes the word frequencies with an L1 norm in conjunction with a magnitude regularization. Weighting factor w2 reduces the undesired interference of large word counts. Weighting factor w3 corresponds to an inverse term frequency that considers a partitioned set defined by previously-classified documents of each available class. And, weighting factor w4 is based on an inverse term frequency that considers a collection of previously-classified documents.

Classifier generator 420, in turn, generates inferred classifier 370 using the weighting factors without needing to provide any parameters. Inferred classifier 370 then classifies unlabeled document 350 to produce labeled document 380, which contingent systems 395 further process.

Figure 5:
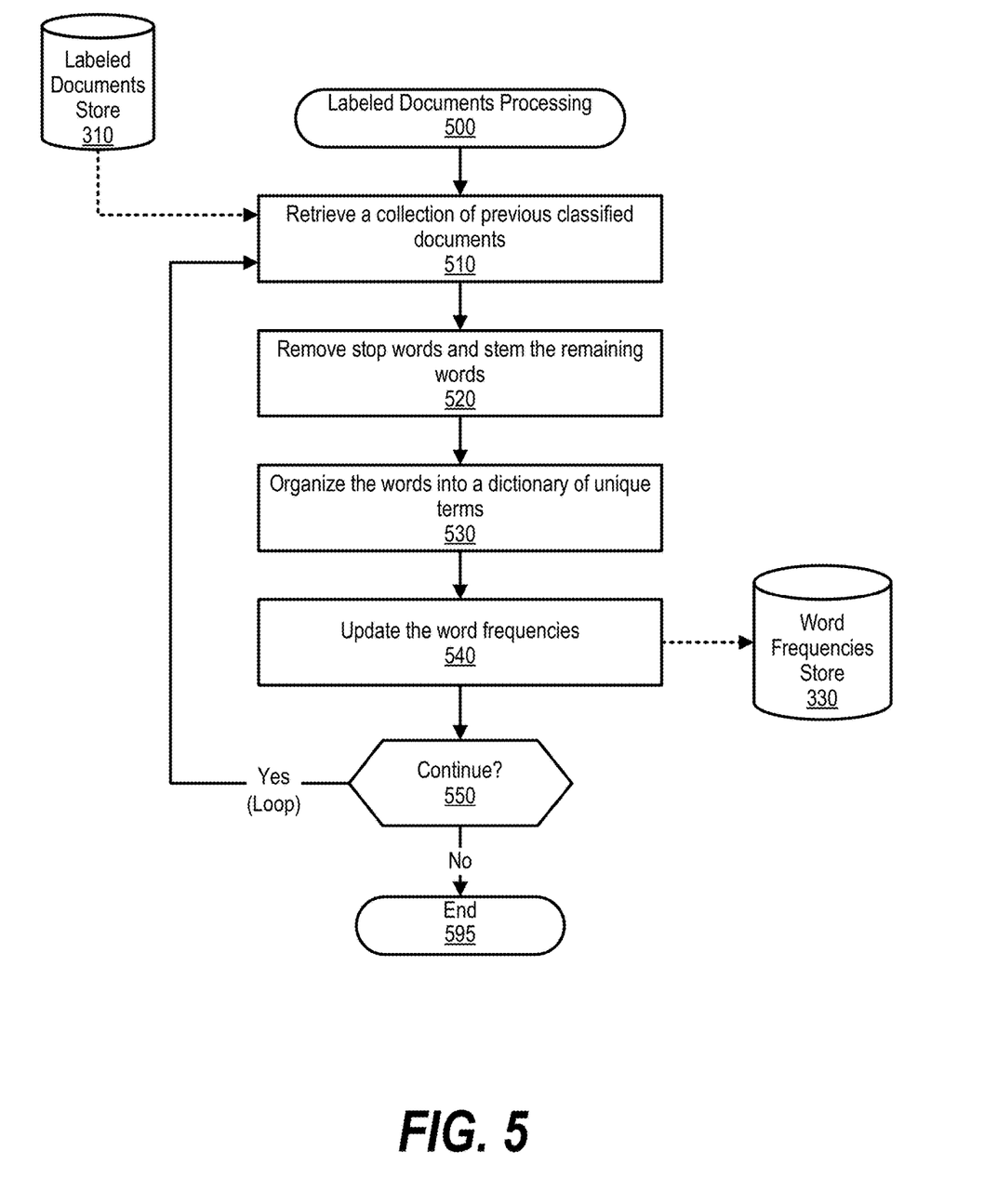
FIG. 5 is an exemplary flowchart showing steps taken to generate word frequencies from a set of labeled documents for a classifier inference module.

FIG. 5 is an exemplary flowchart showing steps taken to generate word frequencies from a set of labeled documents. FIG. 5 processing commences at 500 whereupon step 510, the process retrieves from labeled documents store 310 a collection of previously-classified textual documents C={(d1; c1); ... ; (di; ci); ... ; (dn; cn)}, in which 'di' is the document and 'ci' is a known label or class (e.g., a collection of previously classified work orders with failure codes assigned).

At step 520, the process submits each document of C to an algorithm to remove stop words (meaningless words such as 'of,' 'a,' 'the') and uses a stemmer algorithm to reduce inflected or derived words to their etymological root form. At step 530, the process organizes the words in a dictionary set of unique terms D={w1; ... ; wj; ... ; wm}.

At step 540, the process applies a bag-of-words process in which every document 'di' in a member of set 'C' results in a vector 'vi' containing a number of occurrences for each word in D and maintaining the same order. Vectors vi are placed in a 'n×m' counting matrix 'M' such as matrix 800 shown in FIG. 8 in which 'fij' is the frequency of word 'wj' in document 'di' and 'fj' is the sum of frequencies of word 'wj' in matrix M(n×m). Such a matrix defines a high-dimensional space of documents collections in terms of D. As discussed below, the process infers a text classifier having only the word frequencies that, in turn, minimizes the effort to retrain the classifier.

The process determines as to whether continue (decision 550). If the process should continue, then decision 550 branches to the 'yes' branch which loops back to retrieve and process more previously labeled documents. This looping continues until the process should terminate, at which point decision 550 branches to the 'no' branch exiting the loop. FIG. 5 processing thereafter ends at 595.

FIG. 6 is an exemplary flowchart showing steps taken to infer a classifier for an unlabeled document and use the inferred classifier to classify (label) the unlabeled document. FIG. 6 processing commences at 600 whereupon, at step 610, the process retrieves an unlabeled document from unlabeled documents store 340 (e.g., a maintenance engineer's description of a new work order).

At step 620, the process removes stop words, stems the remaining words, and organizes the words into a dictionary of unique terms. The process counts the frequencies 'fj' of the unique terms and stores the word frequencies in temp store 625.

At step 630, the process retrieves the words frequencies from temp store 625 of the unlabeled document. At step 635, the process computes weighting factor 1 (w1) based on matching historical word frequencies using equation 710 shown in FIG. 7 and stores the results in temp store 640. In this step, the process applies an L1 norm to the frequency 'fi' of word 'wj' in terms of the partitioned set 'Dk' which contains the unique words of D associated with class 'ck' and, to fix the magnitude of the normalization, the process multiplies by the sum of all occurrences of all words defined in the vocabulary D using weighting factor 1. In short, weighting factor w1 normalizes the word frequency with an L1 norm in conjunction with a magnitude regularization.

At step 645, the process computes weighting factor 2 (w2) based on w1 and matching historical word frequencies using equation 720 shown in FIG. 7. The results are stored in temp store 640. In this step, the process applies the term frequency over the L1 norm using weighting factor 2 by applying a logarithm function over equation 710 in FIG. 7. In short, weighting factor w2 computes the term frequency based on the partitioned set defined by the previously-classified documents of each available class.

At step 650, the process computes weighting factor 3 (w3) based on w2 and matching historical word frequencies using equation 730 shown in FIG. 7. The results are stored in temp store 640. In this step, the process multiplies the previous result by the inverse document frequency related to the partitioned set 'Ck' that contains the documents of 'C' previously-classified as class 'ck.'

At step 660, the process computes weighting factor 4 (w4) based on w3 and matching historical word frequencies using equation 740 shown in FIG. 7. The results are stored in temp store 640. In this step, the process adds the inverse document frequency transformation related to the whole collection of documents in C. In short, weighting factor 4 computes the inverse term frequency considering the whole collection of previously-classified documents.

At step 670, the process computes a posteriori probabilities of unlabeled document 350 as one of the available classes. In this step, the process computes a maximum a posteriori (map) probability Pck (du) by applying an exponential function and normalizing it in terms of the estimate probability to automatically infer the classifier of method 'fmethod' and proceeds to classify the unlabeled document 350 'du' using equations 840 and 850 shown in FIG. 8. In short, the process returns a list ordered by relevance of unlabeled document 350 to be classified as each of the possible classes 'ck.'

At step 675, the process generates inferred classifier 370 based on the a posteriori probabilities. For example, the process selects the first class of the list from step 670 to automatically classify unlabeled document 350 (e.g., automatically assign a failure code to the work order created by the maintenance engineer). At step 680, the process classifies words (if applicable) in the document using inferred classifier 370 and generates labeled document 380. At step 690, the process updates the word frequencies in word frequencies store 330 for future document analysis. FIG. 6 processing thereafter ends at 695.

FIG. 7 an exemplary list of weighting factor equations to compute various weighting factors. The approach described herein computes a weight factor wfj associated to each word frequency fj instead of computing the probability P(Bi) in prior systems. Given an unlabeled document 350 (*du*), the approach follows steps of removing stop words, stemming the words, and then counting the frequencies 'fj' of the words in 'D.' If a word occurs in D, the approach computes weight factors 'wfjk' of each word frequency 'fj' of document du associated with a class ck using equations 710, 720, 730, and 740 shown in FIG. 7.

Weighting factor 1 equation 710 applies an L1 norm to the frequency 'fi' of word 'wj' in terms of the partitioned set 'Dk' which contains the unique words of 'D' associated with class 'ck' and, to fix the magnitude of the normalization, equation 710 multiplies by the sum of all occurrences of all words defined in the vocabulary 'D.'

Weighting factor 2 equation 720 applies the term frequency over the L1 norm from the results of weighting factor 1 equation 710. Weighting factor 3 equation 730 multiplies the result form weighting factor 2 equation 720 by an inverse document frequency related to the partitioned set Ck that contains the documents of C previously classified as class ck. Finally, weighting factor 4 equation 740 adds an inverse document frequency transformation related to the whole collection of documents in C to the results of weighting factor 3 equation 730.

FIG. 8 an exemplary list of equations utilized to compute class a posteriori probabilities of an unlabeled document. Matrix 800 is an 'n×m' counting matrix M that includes vectors 'vi' generated from a bag-of-words process discussed earlier in FIG. 5, step 540. Counting matrix 'M' is normalized in terms of words frequencies in which 'fij' is the frequency of word 'wj' in document 'di' and 'fj' is the sum of frequencies of word 'wj' in matrix M(n×m). Counting matrix M defines a high-dimensional space of documents collections in terms of D. As such, for each word, its counter is taken and divided by the total sum of occurrences of the same word in the whole collection to become a probability P(Bi).

Equation 810 estimates the probability P(ckjdu) of unlabeled document 350 (du) to be classified as class ck by the product of all weight factors wf computed in FIG. 6, steps 635 through 660 (see equations 710-740 shown in FIG. 7 and corresponding text for further details). Equation 810 uses the weight factor wfjk of each word wjk of partitioned set Dk present in document du multiplied by the frequency fj of each word wj in document du normalized by the total weight factors associated with document du.

Equation 820 employs a logarithmic function on equation 810 to avoid numerical errors while computing the product of small numbers. A (−1) constant is applied to generate positive results since the logarithmic function applied to numbers between 0 and 1 produces negative values. To report the correct maximum a posteriori (map) probability Pck (du), the approach applies an exponential function and normalizes the values in terms of the estimate probability P(cdkjdu) in equation 820 to infer the classifier of fmethod and proceeds to classify unlabeled document 350 using equation 830. Equation 830 can also be written in detail as equation 840 wherein each weighting factor wfjk is computed using equation 850.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method for classifying an unlabeled document into one of a plurality of available classes, the method implemented by an information handling system that includes a memory and a processor, the method comprising:
  determining a first set of word frequencies of a first set of unique terms in the unlabeled document;
  calculating a plurality of weighting factors based on analyzing the first set of word frequencies against a second set of word frequencies corresponding to a set of labeled documents, wherein the calculating comprises:
    computing a first weighting factor, wherein the first weighting factor normalizes the first set of word frequencies;
    computing a second weighting factor, wherein the second weighting factor applies a logarithm function over the first weighting factor to compute a set of term frequencies of the normalized first set of word frequencies;
    computing a third weighting factor by multiplying the second weighting factor by an inverse document frequency corresponding to a partitioned set of labeled documents included in the set of labeled documents of each one of the plurality of available classes; and
    computing a fourth weighting factor by adding an inverse document frequency transformation corresponding to the set of labeled documents to the third weighting factor;
  computing an a posteriori classification probability of the unlabeled document based on the first weighting factor, the second weighting factor, the third weighting factor, and the fourth weighting factor, wherein the a posteriori classification probability corresponds to one of a plurality of probabilities that the unlabeled document belongs to a corresponding one of the plurality of available classes;
  creating an inferred classifier based on the a posteriori classification probability;
  classifying the unlabeled document using the inferred classifier; and
  updating the second set of word frequencies based on the computed a posteriori classification probability of the unlabeled document.

2. The method of claim 1 further comprising:
  prior to the calculating of the plurality of weighting factors:
    for each one of the set of labeled documents:
      organizing a set of words in the labeled document into a second set of unique terms; and
      generating a vector from the second set of unique terms comprising an amount of occurrences of each of the second set of unique terms; and
    computing the second set of word frequencies based on combining each of the generated vectors of each one of the set of labeled documents, wherein each one of the generated vectors comprises the amount of occurrences of each of the second set of unique terms in a same order.

3. The method of claim 1 further comprising:
  computing a plurality of a posteriori classification probabilities based on the first weighting factor, the second weighting factor, the third weighting factor, and the fourth weighting factor, wherein each one of the plurality of a posteriori classification probabilities corresponds to one of a plurality of probabilities that the unlabeled document belongs to a corresponding one of the plurality of available classes.

4. The method of claim 3 further comprising:
computing a maximum a posteriori probability from the plurality of a posteriori classification probabilities by applying an exponential function to the plurality of a posteriori classification probabilities; and
creating the inferred classifier based on the computed maximum a posteriori probability.

5. An information handling system comprising:
one or more processors;
a memory coupled to at least one of the processors;
a set of computer program instructions stored in the memory and executed by at least one of the processors in order to perform actions of classifying an unlabeled document into one of a plurality of available classes, the actions comprising:
determining a first set of word frequencies of a first set of unique terms in the unlabeled document;
calculating a plurality of weighting factors based on analyzing the first set of word frequencies against a second set of word frequencies corresponding to a set of labeled documents, wherein the calculating comprises:
computing a first weighting factor, wherein the first weighting factor normalizes the first set of word frequencies;
computing a second weighting factor, wherein the second weighting factor applies a logarithm function over the first weighting factor to compute a set of term frequencies of the normalized first set of word frequencies;
computing a third weighting factor by multiplying the second weighting factor by an inverse document frequency corresponding to a partitioned set of labeled documents included in the set of labeled documents of each one of the plurality of available classes; and
computing a fourth weighting factor by adding an inverse document frequency transformation corresponding to the set of labeled documents to the third weighting factor;
computing an a posteriori classification probability of the unlabeled document based on the first weighting factor, the second weighting factor, the third weighting factor, and the fourth weighting factor, wherein the a posteriori classification probability corresponds to one of a plurality of probabilities that the unlabeled document belongs to a corresponding one of the plurality of available classes;
creating an inferred classifier based on the a posteriori classification probability;
classifying the unlabeled document using the inferred classifier; and
updating the second set of word frequencies based on the computed a posteriori classification probability of the unlabeled document.

6. The information handling system of claim 5 wherein the processors perform additional actions comprising:
prior to the calculating of the plurality of weighting factors:
for each one of the set of labeled documents:
organizing a set of words in the labeled document into a second set of unique terms; and
generating a vector from the second set of unique terms comprising an amount of occurrences of each of the second set of unique terms; and
computing the second set of word frequencies based on combining each of the generated vectors of each one of the set of labeled documents, wherein each one of the generated vectors comprises the amount of occurrences of each of the second set of unique terms in a same order.

7. The information handling system of claim 5 wherein the processors perform additional actions comprising:
computing a plurality of a posteriori classification probabilities based on the first weighting factor, the second weighting factor, the third weighting factor, and the fourth weighting factor, wherein each one of the plurality of a posteriori classification probabilities corresponds to one of a plurality of probabilities that the unlabeled document belongs to a corresponding one of the plurality of available classes.

8. The information handling system of claim 7 wherein the processors perform additional actions comprising:
computing a maximum a posteriori probability from the plurality of a posteriori classification probabilities by applying an exponential function to the plurality of a posteriori classification probabilities; and
creating the inferred classifier based on the computed maximum a posteriori probability.

9. A computer program product stored in a computer readable storage medium, comprising computer program code that, when executed by an information handling system, causes the information handling system to perform actions to classify an unlabeled document into one of a plurality of available classes, the actions comprising:
determining a first set of word frequencies of a first set of unique terms in the unlabeled document;
calculating a plurality of weighting factors based on analyzing the first set of word frequencies against a second set of word frequencies corresponding to a set of labeled documents, wherein the calculating comprises:
computing a first weighting factor, wherein the first weighting factor normalizes the first set of word frequencies;
computing a second weighting factor, wherein the second weighting factor applies a logarithm function over the first weighting factor to compute a set of term frequencies of the normalized first set of word frequencies;
computing a third weighting factor by multiplying the second weighting factor by an inverse document frequency corresponding to a partitioned set of labeled documents included in the set of labeled documents of each one of the plurality of available classes; and
computing a fourth weighting factor by adding an inverse document frequency transformation corresponding to the set of labeled documents to the third weighting factor;
computing an a posteriori classification probability of the unlabeled document based on the first weighting factor, the second weighting factor, the third weighting factor, and the fourth weighting factor, wherein the a posteriori classification probability corresponds to one of a plurality of probabilities that the unlabeled document belongs to a corresponding one of the plurality of available classes;
creating an inferred classifier based on the a posteriori classification probability;
classifying the unlabeled document using the inferred classifier; and updating the second set of word frequencies based on the computed a posteriori classification probability of the unlabeled document.

11. The computer program product of claim 9 wherein the information handling system performs further actions comprising:
   computing a plurality of a posteriori classification probabilities based on the first weighting factor, the second weighting factor, the third weighting factor, and the fourth weighting factor, wherein each one of the plurality of a posteriori classification probabilities corresponds to one of a plurality of probabilities that the unlabeled document belongs to a corresponding one of the plurality of available classes.

10. The computer program product of claim 9 wherein the information handling system performs further actions comprising:
   prior to the calculating of the plurality of weighting factors:
      for each one of the set of labeled documents:
         organizing a set of words in the labeled document into a second set of unique terms; and
         generating a vector from the second set of unique terms comprising an amount of occurrences of each of the second set of unique terms; and
      computing the second set of word frequencies based on combining each of the generated vectors of each one of the set of labeled documents, wherein each one of the generated vectors comprises the amount of occurrences of each of the second set of unique terms in a same order.

12. The computer program product of claim 11 wherein the information handling system performs further actions comprising:
   computing a maximum a posteriori probability from the plurality of a posteriori classification probabilities by applying an exponential function to the plurality of a posteriori classification probabilities; and
   creating the inferred classifier based on the computed maximum a posteriori probability.

\* \* \* \* \*